(12) United States Patent
Lauer et al.

(10) Patent No.: US 10,200,111 B2
(45) Date of Patent: *Feb. 5, 2019

(54) SYSTEM FOR MANAGING MOBILE INTERNET PROTOCOL ADDRESSES IN AN AIRBORNE WIRELESS CELLULAR NETWORK

(71) Applicant: GOGO LLC, Chicago, IL (US)

(72) Inventors: Bryan A. Lauer, Chicago, IL (US); Jerry Stamatopoulos, North Aurora, IL (US); Anjum Rashid, Bloomingdale, IL (US); Joseph A. Tobin, Chicago, IL (US); Patrick J. Walsh, Naperville, IL (US); Steven J. Arntzen, Dixon, IL (US)

(73) Assignee: GOGO LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,662

(22) Filed: Sep. 27, 2017

(65) Prior Publication Data

US 2018/0019803 A1    Jan. 18, 2018

Related U.S. Application Data

(63) Continuation of application No. 14/340,921, filed on Jul. 25, 2014, now Pat. No. 9,813,144, which is a (Continued)

(51) Int. Cl.
*H04B 7/185* (2006.01)
*H04L 12/933* (2013.01)
(Continued)

(52) U.S. Cl.
CPC ......... *H04B 7/18506* (2013.01); *H04L 49/15* (2013.01); *H04W 84/005* (2013.01); *H04W 36/08* (2013.01)

(58) Field of Classification Search
CPC ............ H04B 7/18506; H04W 84/005; H04W 36/08; H04L 49/15
(Continued)

(56) References Cited

U.S. PATENT DOCUMENTS 5,042,027 A    8/1991    Takase et al.
5,123,112 A    6/1992    Choate
(Continued)

FOREIGN PATENT DOCUMENTS

CN    102037744 B    1/2014
EP    2260649 B1    6/2014
(Continued)

OTHER PUBLICATIONS

Indian Examination Report, corresponding Indian Application No. 6864/CHENP/2010, dated Dec. 6, 2017.
(Continued)

*Primary Examiner* — Faisal Choudhury
(74) *Attorney, Agent, or Firm* — Marshall, Gerstein & Borun LLP; Randall G. Rueth

(57) ABSTRACT

The Aircraft Mobile IP Address System provides wireless communication services to passengers who are located onboard an aircraft by storing data indicative of the individually identified wireless devices located onboard the aircraft. The System assigns a single IP address to each Point-to-Point Protocol link which connects the aircraft network to the ground-based communication network but also creates an IP subnet onboard the aircraft. The IP subnet utilizes a plurality of IP addresses for each Point-to-Point link thereby to enable each passenger wireless device to be uniquely identified with their own IP address. This is enabled since both Point-to-Point Protocol IPCP endpoints have pre-defined IP address pools and/or topology configured; each Point-to-Point Protocol endpoint can utilize a greater number of IP addresses than one per link. Such an approach does not change IPCP or other EVDO protocols/ messaging but does allow this address to be directly visible to the ground-based communication network.

20 Claims, 8 Drawing Sheets

Related U.S. Application Data continuation of application No. 12/060,645, filed on Apr. 1, 2008, now Pat. No. 8,995,993.

(51) Int. Cl.
*H04W 84/00* (2009.01)
*H04W 36/08* (2009.01)

(58) Field of Classification Search
USPC ......................................................... 370/316
See application file for complete search history.

(56) References Cited

U.S. PATENT DOCUMENTS

| | | |
|---|---|---|
| 5,134,709 A | 7/1992 | Bi et al. |
| 5,212,804 A | 5/1993 | Choate |
| 5,408,515 A | 4/1995 | Bhagat et al. |
| 5,432,841 A | 7/1995 | Rimer |
| 5,519,761 A | 5/1996 | Gilhousen |
| 5,555,444 A | 9/1996 | Diekelman et al. |
| 5,590,395 A | 12/1996 | Diekelman |
| 5,651,050 A | 7/1997 | Bhagat et al. |
| 5,659,304 A | 8/1997 | Chakraborty |
| 5,678,174 A | 10/1997 | Tayloe |
| 5,740,535 A | 4/1998 | Rune |
| 5,754,959 A | 5/1998 | Ueno et al. |
| 5,805,683 A | 9/1998 | Berberich, Jr. |
| 5,887,258 A | 3/1999 | Lemozit et al. |
| 5,950,129 A | 9/1999 | Schmid et al. |
| 5,956,644 A | 9/1999 | Miller et al. |
| 5,995,805 A | 11/1999 | Ogasawara et al. |
| 6,002,944 A | 12/1999 | Beyda |
| 6,009,330 A | 12/1999 | Kennedy, III et al. |
| 6,055,425 A | 4/2000 | Sinivaara |
| 6,144,338 A | 11/2000 | Davies |
| 6,173,159 B1 * | 1/2001 | Wright ............... H04B 7/18506 340/3.5 |
| 6,201,797 B1 | 3/2001 | Leuca et al. |
| 6,263,206 B1 | 7/2001 | Potochniak et al. |
| 6,314,286 B1 | 11/2001 | Zicker |
| 6,324,398 B1 | 11/2001 | Lanzerotti et al. |
| 6,392,692 B1 | 5/2002 | Monroe |
| 6,393,281 B1 | 5/2002 | Capone et al. |
| 6,430,412 B1 | 8/2002 | Hogg et al. |
| 6,577,419 B1 | 6/2003 | Hall et al. |
| 6,581,915 B2 | 6/2003 | Bartsch et al. |
| 6,690,928 B1 | 2/2004 | Konishi et al. |
| 6,735,438 B1 | 5/2004 | Sabatino |
| 6,735,500 B2 | 5/2004 | Nicholas et al. |
| 6,754,489 B1 | 6/2004 | Roux |
| 6,760,778 B1 | 7/2004 | Nelson et al. |
| 6,788,935 B1 | 9/2004 | McKenna et al. |
| 6,795,408 B1 | 9/2004 | Hiett |
| 6,889,042 B2 | 5/2005 | Rousseau et al. |
| 6,948,033 B2 | 9/2005 | Ninose et al. |
| 7,599,691 B1 * | 10/2009 | Mitchell ............... G06Q 30/02 455/3.02 |
| 8,995,993 B2 | 3/2015 | Lauer et al. |
| 2002/0045444 A1 | 4/2002 | Usher et al. |
| 2002/0123344 A1 | 9/2002 | Criqui et al. |
| 2002/0155833 A1 | 10/2002 | Borel |
| 2003/0048766 A1 | 3/2003 | D'Annunzio et al. |
| 2003/0050746 A1 | 3/2003 | Baiada et al. |
| 2003/0084130 A1 | 5/2003 | D'Annunzio |
| 2003/0084174 A1 | 5/2003 | D'Annunzio et al. |
| 2003/0128671 A1 | 7/2003 | Niesen |
| 2003/0194967 A1 | 10/2003 | Sanford et al. |
| 2004/0142658 A1 | 7/2004 | McKenna et al. |
| 2004/0203918 A1 | 10/2004 | Moriguchi et al. |
| 2005/0071076 A1 | 3/2005 | Baiada et al. |
| 2005/0221875 A1 | 10/2005 | Grossman et al. |
| 2007/0021117 A1 * | 1/2007 | McKenna ............... H01Q 1/007 455/431 |
| 2007/0087756 A1 | 4/2007 | Hoffberg |
| 2007/0105600 A1 | 5/2007 | Mohanty et al. |
| 2008/0102814 A1 | 5/2008 | Chari et al. |
| 2014/0334379 A1 | 11/2014 | Lauer et al. |

FOREIGN PATENT DOCUMENTS

| | | |
|---|---|---|
| WO | WO-1998010534 A1 | 3/1998 |
| WO | WO-2003036917 A2 | 5/2003 |

OTHER PUBLICATIONS

Casewell, The provision of GSM cellular radio environments within passenger aircraft operating over Europe, Fifth International Conference on Mobile Radio and Personal Communications, pp. 172-176 (1989).

Examination Search Report, Canadian patent application No. 2,720,142, dated Jun. 22, 2015.

* cited by examiner

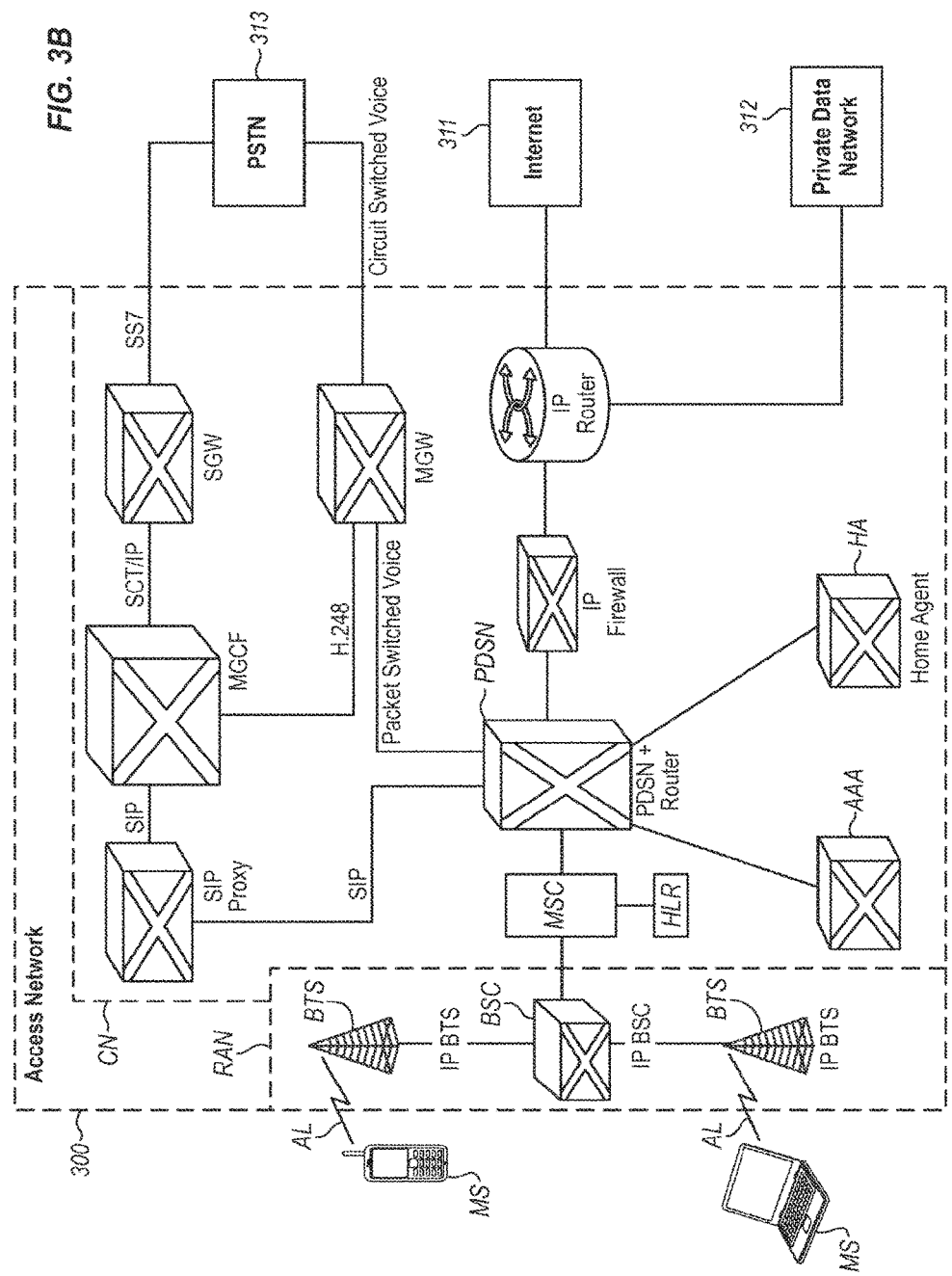

SYSTEM FOR MANAGING MOBILE INTERNET PROTOCOL ADDRESSES IN AN AIRBORNE WIRELESS CELLULAR NETWORK

CROSS-REFERENCE TO RELATED APPLICATIONS

This is a continuation application that claims priority to and the benefit of the filing date of U.S. application Ser. No. 14/340,921, filed Jul. 25, 2014 and entitled "System for Managing Mobile Internet Protocol Addresses in an Airborne Wireless Cellular Network," which is a continuation of U.S. application Ser. No. 12/060,645, filed Apr. 1, 2008 and entitled "System for Managing Mobile Internet Protocol Addresses in an Airborne Wireless Cellular Network," the entire disclosures of which are incorporated herein by reference.

FIELD OF THE INVENTION

This invention relates to cellular communications and, in particular, to a system that creates an Internet Protocol based subnet on board an aircraft in an airborne wireless cellular network.

BACKGROUND OF THE INVENTION

It is a problem in the field of wireless communications to manage the wireless services provided by an aircraft network to passengers who are located in the aircraft as they roam among cell sites in the non-terrestrial cellular communication network. The aircraft network serves a plurality of subscribers, yet has a link to the ground-based network via a wide bandwidth connection that concurrently serves multiple individual subscribers. The management of this wide bandwidth connection to enable the individual identification of aircraft-based subscribers has yet to be addressed in existing wireless networks.

In the field of terrestrial cellular communications, it is common for a wireless subscriber to move throughout the area served by the network of their home cellular service provider and maintain their desired subscriber feature set. Feature set availability throughout the home network is managed by the home cellular service provider's database, often termed a Home Location Register (HLR), with data connections to one or more switches (packet or circuit), and various ancillary equipment, such as voice mail and short message servers, to enable this seamless feature set management. Each subscriber is associated with a one-to-one communication connection, which comprises a channel on the serving cell site, to access the desired communication services.

If the wireless subscriber were to transition inter-network from the coverage area of their home cellular network to a network of the same or another cellular service provider (termed "roaming cellular service provider" herein), the wireless subscriber should have the ability to originate and receive calls in a unified manner, regardless of their location. In addition, it should be possible for a given wireless subscriber's feature set to move transparently with them. However, for this feature set transportability to occur, there needs to be database file sharing wherein the home cellular service Home Location Register (HLR) transfers the subscriber's authorized feature set profile to the roaming cellular service provider's database, often called a Visitor Location Register, or VLR. The VLR then recognizes that a given roaming wireless subscriber is authorized for a certain feature set and enables the roaming cellular service provider network to transparently offer these features to the wireless subscriber. In this manner, the roaming wireless subscriber retains the same authorized feature set, or "subscriber class", as they had on their home cellular service provider network.

When wireless subscribers enter the non-terrestrial cellular communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the individual passengers who are onboard the aircraft. However, although the aircraft network serves a plurality of passengers, it has a link to the ground-based Access Network via a wide bandwidth radio frequency connection that has a single IP address on the ground-based Access Network. Thus, the wide bandwidth radio frequency connection concurrently carries the communications of multiple individual passengers, but these communications cannot be individually identified by the ground-based Access Network. The management of this wide bandwidth connection to enable the individual identification of passengers via the assignment of individual unique IP addresses to each passenger wireless device has yet to be addressed in existing wireless networks.

BRIEF SUMMARY OF THE INVENTION

The above-described problems are solved and a technical advance achieved in the field by the present System For Managing Mobile Internet Protocol Addresses In An Airborne Wireless Cellular Network (termed "Aircraft Mobile IP Address System" herein), which enables the assignment of individual Internet Protocol (IP) addresses to each of the passenger wireless devices, operating in an aircraft and served by an airborne wireless cellular network, thereby to enable delivery of wireless services to the individually identified passenger wireless devices.

The Aircraft Mobile IP Address System provides wireless communication services to passengers who are located onboard an aircraft by storing data indicative of the individually identified wireless devices that are located onboard the aircraft. The Aircraft Mobile IP Address System assigns a single IP address either to each Air-to-Ground Modem in the Air-to-Ground Communications Unit which terminates the radio frequency link which connects the aircraft network to the ground-based Access Network, or the MIP client that executes on the Air-to-Ground Control Processor Unit located behind these Air-to-Ground Modems. A third approach is to dispense with the use of a Mobile IP Client and to use Simple IP Addresses and an IP Tunnel to connect the aircraft network to the ground-based Access Network. Such an approach does not change IPCP or other EVDO protocols/messaging but does allow the wireless device individual IP address to be directly visible to the ground-based Access Network.

The electronic services that are provided to the passenger include Internet, in-flight entertainment services, such as multi-media presentations, as well as destination-based services, which link the passenger's existing travel plans with offers for additional services that are available to the passenger at their nominal destination and their planned travel schedule, and optionally, voice services. The passenger thereby is presented with opportunities during their flight to enhance their travel experience, both in-flight and at their destination, by accessing the various services. The individual identification of each passenger wireless device simplifies the provision of these services and enables the customization of these services based upon predefined profiles created for the passenger.

BRIEF DESCRIPTION OF THE DRAWINGS

FIGS. 3A and 3B illustrate, in block diagram form, the architecture of a typical EVDO cellular network for IP data only service and for IP data and voice services, respectively;

DETAILED DESCRIPTION OF THE INVENTION

Overall System Architecture

Figure 1:
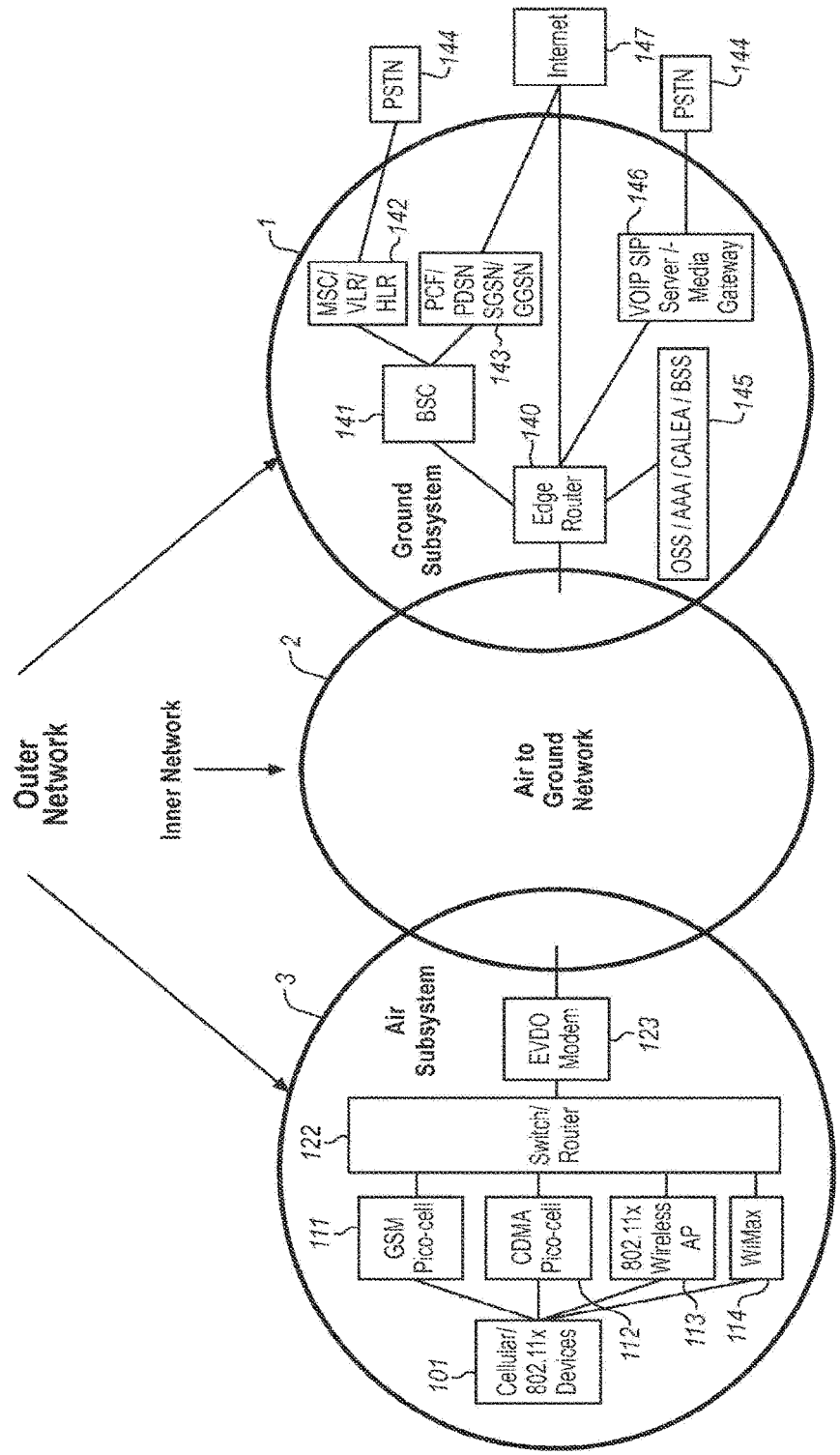
FIG. 1 illustrates, in block diagram form, the overall architecture of a composite air-to-ground network that interconnects an Air Subsystem with a Ground-Based Access Network.

FIG. 1 illustrates, in block diagram form, the overall architecture of the non-terrestrial cellular communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial cellular communication network and, for the purpose of simplicity of illustration, does not comprise all of the elements found in a typical non-terrestrial cellular communication network. The fundamental elements disclosed in FIG. 1 provide a teaching of the interrelationship of the various elements which are used to implement a non-terrestrial cellular communication network to provide content to passenger wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passenger wireless devices that are located in the aircraft to receive services in the aircraft.

Air Subsystem

The "Air Subsystem" is the communications environment that is implemented in the aircraft, and these communications can be based on various technologies including, but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to the passenger wireless devices that passengers and crew carry on the aircraft. Thus, a laptop computer can communicate via a WiFi or WiMax wireless mode (or via a wired connection, such as a LAN), or a PDA could communicate telephony voice traffic via VoIP (Voice over IP). Likewise, a hand-held cell phone that uses the GSM protocol communicates via GSM when inside the aircraft to the Air Subsystem. A CDMA cell phone would use CDMA, and an analog AMPS phone would use analog AMPS when inside the aircraft to the Air Subsystem 3. The connection states could be packet-switched or circuit-switched or both. Overall, the objective on the Air Subsystem 3 is to enable seamless and ubiquitous access to the Air Subsystem 3 for the passenger wireless devices that are carried by passengers and crew, regardless of the technology used by these wireless devices.

The Air Subsystem 3 also provides the mechanism to manage the provision of services to the passenger wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passenger wireless devices 101 used in the aircraft can be identical to those used on the cellular/PCS ground-based communication network; however, these passenger wireless devices 101 are pre-registered with the carrier serving the aircraft, and/or users have PIN numbers for authentication. In addition, an antenna interconnects the passenger wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based Access Network 1, since the Switch/Router 122 places a call using the Modem 123 to the ground-based Access Network 1 via the Air-To-Ground Network 2. Switch/Router 122 converts the individual traffic and signaling channels from the base stations to/from an aggregate data stream and transmits/receives the aggregate data streams over the Air-to-Ground Network 2 which maintains continuous service as the aircraft travels. The Modem 123 includes radio transmission equipment and antenna systems to communicate with ground-based transceivers in the ground-based portion of the Air-to-Ground Network 2. The individual traffic channels assigned on the Air-to-Ground Network 2 are activated based upon the traffic demand to be supported from the aircraft.

Air-to-Ground Network

The Air-to-Ground Network 2 shown in FIG. 1 is clearly one that is based on wireless communications (radio frequency or optical) between the Ground Subsystem 1 and the passenger wireless devices 101 that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to ground connection carries both passenger communications traffic and native network signaling traffic. In the preferred embodiment, the Air-to-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to an aircraft include broad or wide area links such as HF (High Frequency) radio and more unique systems such as troposcatter architectures.

The Air-To-Ground Network 2 can be viewed as the conduit through which the passenger communications traffic, as well as the control and network feature set data, is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

The radio frequency design for the Air-To-Ground Modem typically uses multiple modems, where one Air-To-Ground Modem (Air-to-Ground Modem 1) operates with a Vertical signal polarization and one Air-To-Ground Modem (Air-to-Ground Modem 2) operates with a Horizontal signal polarization, and as signal strength is lost/gained on the individual Air-To-Ground Modems, that Air-To-Ground Modem becomes dormant or active.

In a first embodiment of this protocol, the Air-To-Ground Modems are not assigned an IP address, but there is a Mobile IP Client on the Air-To-Ground Communications Unit with a Forward Address on the Public Data Switched Network. This Mobile IP Client is configured with a Home Address and registers with a corresponding Foreign Address/Home Address to associate a Home Address with Air-To-Ground Modem1 or Air-To-Ground Modem2 on the Public Data Switched Network/Foreign Address. The Home Address to Care of Address (subnet address) association does not change, since the Care of Address is the Public Data Switched Network IP address and managed in the Public Data Switched Network. The Mobile IP Client on the Air-To-Ground Communications Unit requires information from the Air-To-Ground Modem to update Mobile IP bindings on Foreign Address/Home Address. The Mobile IP Client must receive Air-To-Ground Modem1 and Air-To-Ground Modem 2 Assigned IP (this is the Care of Address for the Mobile IP Client). The Mobile IP Client shall have configured/known Home Address and Home Agent Server Address. This configuration can run multiple Mobile IP Clients and tunnels on the Air-To-Ground Communications Unit.

In a second embodiment of this protocol, the Air-To-Ground Modems are each assigned an IP address and the Mobile IP Client resides on the Air-To-Ground Control Processor Unit. This Mobile IP Client is configured with a Home Address, and a corresponding Care of Address is associated with Air-To-Ground Modem1 or Air-To-Ground Modem2 in the Air-To-Ground Communications Unit. The Mobile IP Client on the Air-To-Ground Control Processor Unit is connected via a Mobile IP Tunnel to the Public Data Switched Network. The traffic is switched between the two Air-To-Ground Modems as signal strength is lost/gained on the individual Air-To-Ground Modems.

In a third embodiment of this protocol, the Air-To-Ground Modems are each assigned an IP address, and Simple IP Addresses are managed on the Air-To-Ground Communications Unit. Multiple IP Tunnels connect the Air-To-Ground Control Processor Unit to a Router in the ground-based Access Network. The Air-To-Ground Control Processor Unit performs the tunnel endpoint functions and uses a Public Address for these IP Tunnels. The traffic is switched between the two Air-To-Ground Modems as signal strength is lost/gained on the individual Air-To-Ground Modems.

Ground Subsystem

The Ground Subsystem 1 consists of Edge Router 140 which connects the voice traffic of the Air-To-Ground Network 2 with traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 124 also provides interconnection of the data traffic to the Internet 147, Public Switched Telephone Network 144 via Voice Over IP Server 146, and other such functionalities. These include the Authentication Server, Operating Subsystems, CALEA, and BSS servers 145.

Thus, the communications between the passenger wireless devices 101 located in an aircraft and the Ground Subsystem 1 of the ground-based communication network are transported via the Air Subsystem 3 and the Air-To-Ground Network 2 to the ground-based Base Station Controllers 141 of the non-terrestrial cellular communication network. The enhanced functionality described below and provided by the Air Subsystem 3, the Air-To-Ground Network 2, and the ground-based Base Station Controllers 141 renders the provision of services to the passenger wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks (RAN) in different locations (different Ground Subsystems 1), in order to maintain continuity of service on Air-to-Ground Network 2. Handovers may be hard or soft, or may be a combination of hard and soft on the air-ground and ground-air links.

The Mobile Switching Center (MSC) provides mobility management for all airborne systems and provides handover management between ground stations as an airborne system moves between the service areas of adjoining Ground Subsystems 1. The Base Station Controller (BSC) interfaces all traffic to/from the Base Transceiver Subsystem (BTS). The Packet Data Serving Node (PDSN) controls assignment of capacity of each of the Base Transceiver Subsystems (BTS) among the airborne systems within their respective service areas.

Typical Aircraft-Based Network

Figure 2:
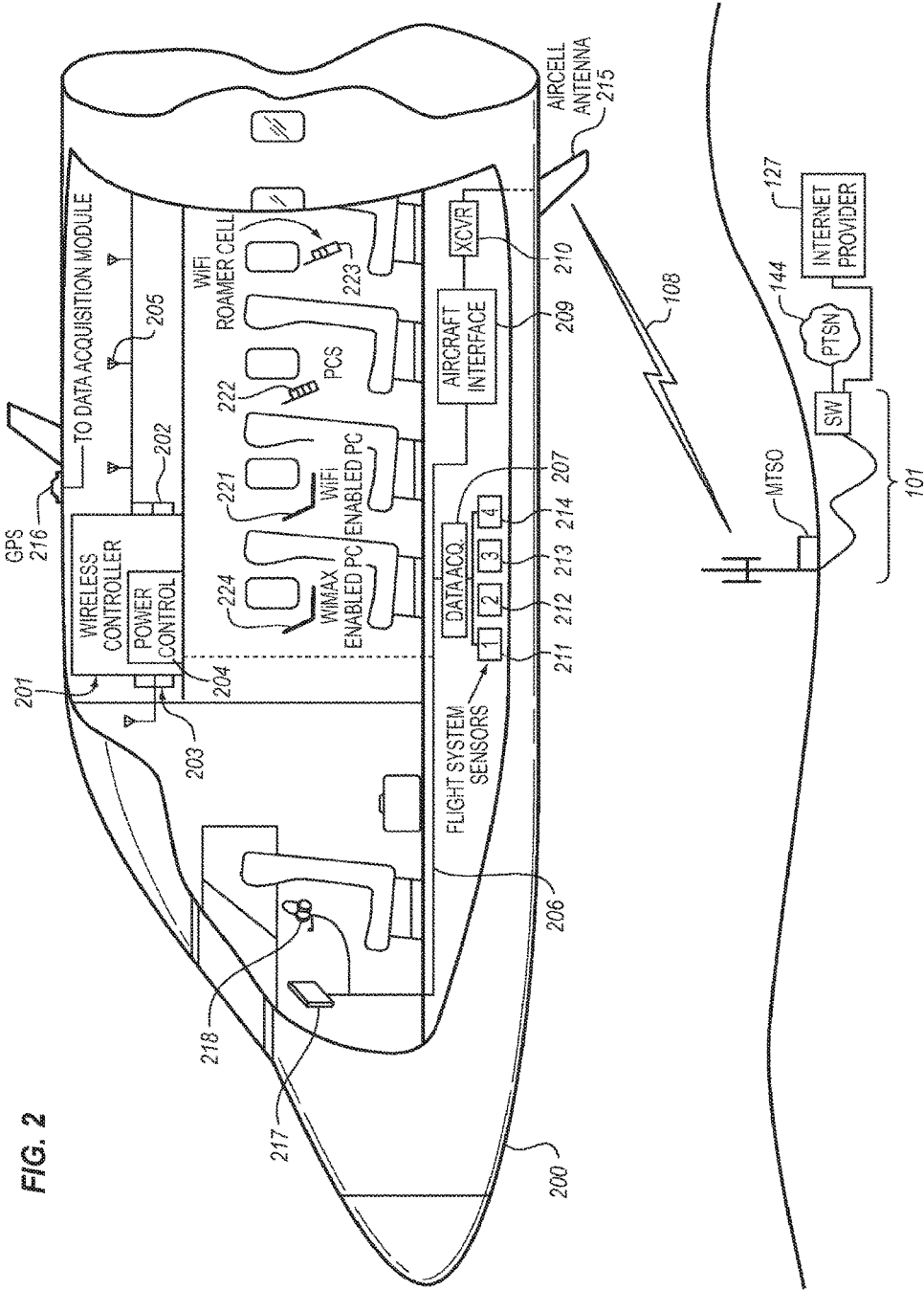
FIG. 2 illustrates, in block diagram form, the architecture of a typical embodiment of a typical aircraft-based network for wireless devices as embodied in a multi-passenger commercial aircraft.

FIG. 2 illustrates the architecture of a typical aircraft-based network for passenger wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passenger wireless devices comprises a Local Area Network 206 that includes a radio frequency communication system 201 that uses a spread spectrum paradigm and having a short range of operation. This network 206 supports both circuit-switched and packet-switched connections from passenger wireless devices 221-224 and interconnects the communications of these passenger wireless devices 221-224 via a gateway transceiver or transceivers 210 to the Public Switched Telephone Network (PSTN) 126 and other destinations, such as the Internet 127 or Public Data Switched Network (PDSN). The wireless passengers thereby retain their single number identity as if they were directly connected to the Public Switched Telephone Network 126. The passenger wireless devices 221-224 include a diversity of communication devices, such as laptop computers 221, cellular telephones 222, MP3 music players (not shown), Personal Digital Assistants (PDA) (not shown), WiFi-based devices 223, WiMax-based devices 224, and the like, and for simplicity of description are all collectively termed "passenger wireless devices" herein, regardless of their implementation—specific details.

The basic elements of the aircraft-based network for passenger wireless devices comprises at least one antenna 205 or means of coupling electromagnetic energy to/from the Air Subsystem 3 located within the aircraft 200 which serves to communicate with the plurality of passenger wireless devices 221-224 located within the aircraft 200. The at least one antenna 205 is connected to a wireless controller 201 that encompasses a plurality of elements that serve to regulate the wireless communications with the plurality of passenger wireless devices 221-224. The wireless controller 201 includes at least one low power radio frequency transceiver 202 for providing a circuit switched communication space using a wireless communication paradigm, such as PCS, CDMA, or GSM, for example. In addition, the wireless controller 201 includes a low power radio frequency transceiver 203 for providing a data-based packet-switched communication space using a wireless communication paradigm, such as WiFi (which could also convey packet-switched Voice over Internet Protocol (VoIP)).

Finally, the wireless controller 201 includes a power control segment 204 that serves to regulate the power output of the plurality of passenger wireless devices. It also serves, by RF noise or jamming apparatus, to prevent In-Cabin passenger wireless devices from directly and errantly accessing the ground network when in a non-terrestrial mode. The ultra-low airborne transmit power levels feature represents a control by the Power Control element 204 of the wireless controller 201 of the aircraft-based network for passenger wireless devices to regulate the output signal power produced by the passenger wireless devices 221-224 to minimize the likelihood of receipt of a cellular signal by ground-based cell sites or ground-based wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a backbone network 206 to a plurality of other elements which serve to provide services to the passenger wireless devices 221-224. These other elements can include an Aircraft Interface 209 (which includes the "Air-To-Ground Communications Unit" and the "Air-To-Ground Control Processor Unit") for providing management, switching, routing, and aggregation functions for the communication transmissions of the passenger wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this backbone network 206 either via a wired connection or a wireless connection.

Finally, a gateway transceiver(s) 210 is used to interconnect the Aircraft Interface 209 to an antenna 215 to enable signals to be transmitted via link 108 from the aircraft-based network for passenger wireless devices 221-224 to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (ERP) may be used in the implementation of the antenna(s) 215 on the aircraft to serve the aircraft-based network for passenger wireless devices 221-224.

Passenger Login for System Access

On each aircraft, the passenger access to electronic communications typically is regulated via a passenger's wireless device registration process, where each electronic device must be identified, authenticated, and authorized to receive service. Since the aircraft is a self-contained environment with respect to the wireless communications between the passenger wireless devices and the airborne wireless network extant in the aircraft, all communications are regulated by the network controller. Thus, when a passenger activates their passenger's wireless device, a communication session is initiated between the passenger's wireless device and the network controller to identify the type of device the passenger is using and, thus, its wireless protocol. A "splash screen" is delivered to the passenger on their wireless device to announce entry into the wireless network portal. Once this is established, the network controller transmits a set of login displays to the passenger's wireless device to enable the passenger to identify themselves and validate their identity (if the passenger's wireless device is not equipped to automatically perform these tasks via a smart client which automatically logs the passenger into the network). As a result of this process, the passenger's wireless device is provided with a unique electronic identification (IP address), and the network can respond to the passenger's wireless device without further administrative overhead. The authentication process may include the use of security processes, such as a password, scan of a passenger immutable characteristic (fingerprint, retina scan, etc.), and the like.

Once the passenger's wireless device is logged in, the passenger can access the free standard electronic services that are available from the network or customized electronic services for the particular passenger. The screens that are presented to the passengers can be customized to present the branding of the airline on which the passenger is traveling.

Mobile Wireless Network Architecture

Figure 3A:
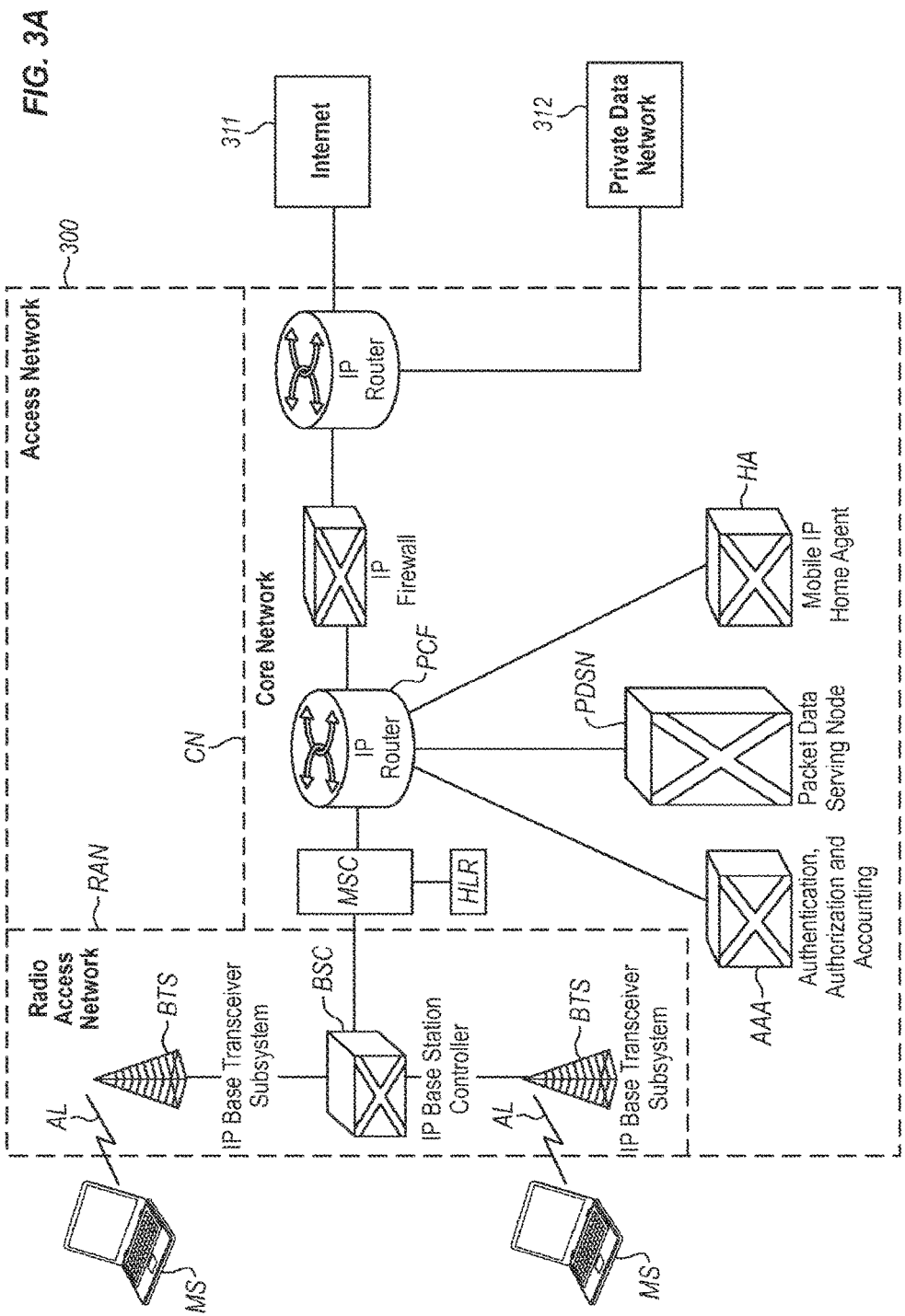

For simplicity of description, the following example is based upon the use of a CDMA2000 EVDO cellular network paradigm. However, the concepts illustrated herein are not limited to this implementation, and it is expected that other implementations can be created based upon other network architectures and implementations. Therefore, FIGS. 3A and 3B illustrate, in block diagram form, the architecture of a typical EVDO cellular network for IP data only service and for IP data and voice services, respectively, and which are used to illustrate the architecture and operation of the present Aircraft Mobile IP Address System. CDMA2000 is a hybrid 2.5G/3G technology of mobile telecommunications that uses CDMA (code division multiple access) to send digital radio, voice, data, and signaling data between wireless devices and cell sites. The architecture and operation of the CDMA2000 cellular network is standardized by the 3rd Generation Partnership Project 2 (3GPP2). In a CDMA2000 cellular network, two Radio Access Network technologies are supported: 1×RTT and EV-DO (Evolution-Data Optimized), wherein CDMA2000 is considered a third generation (3G) technology when the EV-DO Access Network is used.

The CDMA 2000 cellular network (also termed "Access Network" herein) comprises three major parts: the core network (CN), the Radio Access Network (RAN), and the wireless device (MS). The core network (CN) is further decomposed in two parts, one interfacing to external networks such as the Public Switched Telephone Network (PSTN) and the other interfacing to an IP based network such as the Internet 311 and/or private data networks 312. The wireless device MS terminates the radio path on the user side of the cellular network and enables subscribers to access network services over the interface Um implemented to interconnect the wireless device (MS) with the Access Network 300.

Several key components of the Access Network 300 for IP data only as illustrated in FIG. 3A are:

Base Transceiver System (BTS): an entity that provides transmission capabilities across the Um reference point. The Base Transceiver System (BTS) consists of radio devices, antenna, and equipment.

Base Station Controller (BSC): an entity that provides control and management for one or more Base Transceiver Systems (BTS).

Packet Control Function (PCF): an entity that provides the interface function to the packet-switched network (Internet 311 and/or Private Data Network 312).

The wireless device (MS) functions as a mobile IP client. The wireless device (MS) interacts with the Access Network 300 to obtain appropriate radio resources for the exchange of packets and keeps track of the status of radio resources (e.g., active, stand-by, dormant). The wireless device (MS) accepts buffer packets from the Base Transceiver System (BTS) when radio resources are not in place or are insufficient to support the flow to the Access Network 300. Upon power-up, the wireless device (MS) automatically registers with the Home Location Register (HLR) in the Mobile Switching Center (MSC) in order to:

Authenticate the wireless device (MS) for the environment of the accessed network;

Provide the Home Location Register (HLR) with the wireless device's present location; and Provide the Serving Mobile Switching Center (MSC) with the wireless device's permitted feature set.

After successfully registering with the Home Location Register (HLR), the wireless device (MS) is ready to place voice and data calls. These may take either of two forms, Circuit-Switched Data (CSD) or Packet-Switched Data (PSD), depending on the wireless device's own compliance (or lack thereof) with the IS-2000 standard.

Wireless devices must comply with IS-2000 standards to initiate a packet data session using the Access Network 300. Wireless devices which have only IS-95 capabilities are limited to Circuit-Switched Data transmitted via the Public Switched Telephone Network (PSTN), while IS-2000 terminals can select either the Packet-Switched Data or Circuit-Switched Data. Parameters forwarded by the wireless device (MS) over the air link (AL) to the Access Network 300 determine the type of service requested. For each data session, a Point-to-Point Protocol (PPP) session is created between the wireless device (MS) and the Packet Data Serving Node (PDSN). IP address assignment for each wireless device can be provided by either the Packet Data Serving Node (PDSN) or a Dynamic Host Configuration Protocol (DHCP) server via a Home Agent (HA).

The Radio Access Network (RAN)

The Radio Access Network (RAN) is the wireless device's entry point for communicating either data or voice content. It consists of:

The air link (AL);

The cell site tower/antenna and the cable connection to the Base Transceiver Subsystem (BTS);

The Base Transceiver Subsystem (BTS);

The communications path from the Base Transceiver Subsystem to the Base Station Controller (BSC);

The Base Station Controller (BSC); and

The Packet Control Function (PCF).

The Radio Access Network (RAN) has a number of responsibilities that impact the network's delivery of packet services in particular. The Radio Access Network (RAN) must map the mobile client identifier reference to a unique link layer identifier used to communicate with the Packet Data Serving Node (PDSN), validate the wireless device for access service, and maintain the established transmission links.

The Base Transceiver Subsystem (BTS) controls the activities of the air link (AL) and acts as the interface between the Access Network 300 and the wireless device (MS). Radio Frequency resources such as frequency assignments, sector separation, and transmit power control are managed at the Base Transceiver Subsystem (BTS). In addition, the Base Transceiver Subsystem (BTS) manages the back-haul from the cell site to the Base Station Controller (BSC) to minimize any delays between these two elements.

The Base Station Controller (BSC) routes voice- and circuit-switched data messages between the cell sites and the Mobile Switching Center (MSC). It also bears responsibility for mobility management: it controls and directs handoffs from one cell site to another as needed.

The Packet Control Function (PCF) routes IP packet data between the mobile station (MS) within the cell sites and the Packet Data Serving Node (PDSN). During packet data sessions, it assigns available supplemental channels as needed to comply with the services requested by the wireless device (MS) and paid for by the subscribers.

Packet Data Serving Node (PDSN)

The Packet Data Serving Node (PDSN) is the gateway from the Radio Access Network (RAN) into the public and/or private packet networks. In a simple IP network, the Packet Data Serving Node (PDSN) acts as a standalone Network Access Server (NAS); in a mobile IP network, it can be configured as a Home Agent (HA) or a Foreign Agent (FA). The Packet Data Serving Node (PDSN) implements the following activities:

Manage the radio-packet interface between the Base Station Subsystem (BTS), the Base Station Controller (BSC), and the IP network by establishing, maintaining, and terminating link layer to the mobile client;

Terminate the Point-to-Point Protocol (PPP) session initiated by the subscriber;

Provide an IP address for the subscriber (either from an internal pool or through a Dynamic Host Configuration Protocol (DHCP) server or through an Authentication, Authorization, and Accounting (AAA) server);

Perform packet routing to external packet data networks or packet routing to the Home Agent (HA) which optionally can be via secure tunnels;

Collect and forward packet billing data;

Actively manage subscriber services based on the profile information received from the SCS server of the Authentication, Authorization, and Accounting (AAA) server; and Authenticate users locally, or forward authentication requests to the Authentication, Authorization, and Accounting (AAA) server.

Authentication, Authorization, and Accounting Server

The Authentication, Authorization, and Accounting (AAA) server is used to authenticate and authorize subscribers for network access and to store subscriber usage statistics for billing and invoicing.

The Home Agent

The Home Agent (HA) supports seamless data roaming into other networks that support 1×RTT. The Home Agent (HA) provides an anchor IP address for the mobile system and forwards any mobile-bound traffic to the appropriate network for delivery to the handset. It also maintains user registration, redirects packets to the Packet Data Serving Node (PDSN), and (optionally) tunnels securely to the Packet Data Serving Node (PDSN). Lastly, the Home Agent (HA) supports dynamic assignment of users from the Authentication, Authorization, and Accounting (AAA) server and (again optionally) assigns dynamic home addresses.

Traditional Single Call Setup in a CDMA2000 Access Network

A successful call set-up scenario for a single wireless device to establish a communication connection in a CDMA2000 Access Network is described below. Note that this explanation bypasses the radio reception/transmission activities of the Base Transceiver Subsystem (BTS), concentrating instead on the protocol functions that begin with the Origination dialogue between the wireless device (MS) and the Base Station Controller (BSC):

1. To register for packet data services, the wireless device (MS) sends an Origination Message over the Access Channel to the Base Station Subsystem (BSS).
2. The Base Station Subsystem (BSS) acknowledges the receipt of the Origination Message, returning a Base Station Acknowledgment Order to the wireless device (MS).
3. The Base Station Subsystem (BSS) constructs a CM Service Request message and sends the message to the Mobile Switching Center (MSC).
4. The Mobile Switching Center (MSC) sends an Assignment Request message to the Base Station Subsystem (BSS) requesting assignment of radio resources. No terrestrial circuit between the Mobile Switching Center (MSC) and the Base Station Subsystem (BSS) is assigned to the packet data call.
5. The Base Station Subsystem (BSS) and the wireless device (MS) perform radio resource set-up procedures. The Packet Control Function (PCF) recognizes that no A10 connection associated with this wireless device (MS) is available and selects a Packet Data Serving Node (PDSN) for this data call. The A10 connection is a term defined by the standards bodies and refers to an Interface between Base Station Controller (BSC) and the Packet Data Serving Node (PDSN), where A10 references IP user data exchanged between the Base Station Controller (BSC) and the Packet Data Serving Node (PDSN).
6. The Packet Control Function (PCF) sends an A11-Registration Request message to the selected Packet Data Serving Node (PDSN).
7. The A11-Registration Request is validated, and the Packet Data Serving Node (PDSN) accepts the connection by returning an A11-Registration Reply message. Both the Packet Data Serving Node (PDSN) and the Packet Control Function (PCF) create a binding record for the A10 connection. The term "A11" references signaling exchanged between the Base Station Controller (BSC) and the Packet Data Serving Node (PDSN).
8. After both the radio link and the A10 connection are set up, the Base Station Subsystem (BSS) sends an Assignment Complete message to the Mobile Switching Center (MSC).
9. The mobile system and the Packet Data Serving Node (PDSN) establish the link layer (PPP) connection and then perform the Mobile IP registration procedures over the link layer (PPP) connection.
10. After completion of Mobile IP registration, the mobile system can send/receive data via GRE framing over the A10 connection.
11. The Packet Control Function (PCF) periodically sends an A11-Registration Request message for refreshing registration for the A10 connection.
12. For a validated A11-Registration Request, the Packet Data Serving Node (PDSN) returns an A11-Registration Reply message. Both the Packet Data Serving Node (PDSN) and the Packet Control Function (PCF) update the A10 connection binding record.

For a circuit-switched voice call, the additional elements shown in FIG. 3B are required. In particular, the packet-switched voice received from the wireless device (MS) is forwarded from the Packet Data Serving Node (PDSN) to the Media Gateway (MGW) where it is converted to circuit-switched voice and delivered to the Public Switched Telephone Network (PTSN). In addition, call setup data is exchanged with the Session Initiated protocol Proxy Server (SIP) to provide a signaling and call setup protocol for IP-based communications that can support a superset of the call processing functions and features present in the Public Switched Telephone Network (PSTN). The Media Gateway Control Function (MGCF) and the Signaling Gateway (SGW) implement the call processing features present in Signaling System 7 (SS7).

Figure 4:
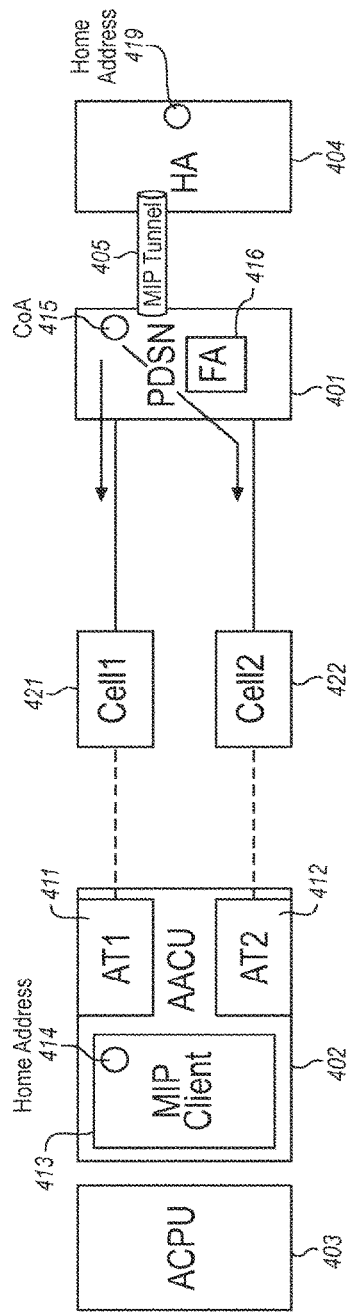
FIG. 4 illustrates, in block diagram form, the architecture of an implementation of the Aircraft Mobile IP Address System which provides mobile IP addresses within the EVDO Network.

FIG. 4 illustrates, in block diagram form, the architecture of an implementation of the Aircraft Mobile IP Address System which provides mobile IP addresses within the EVDO Network described above. The Public Data Switched Network 401 is connected via the radio frequency links of a plurality of Cells 421, 422 to the Air-to-Ground Communications Unit 402 (part of the Aircraft Interface 209 of FIG. 2) and then to the Air-to-Ground Control Processing Unit 403 (part of the Aircraft Interface 209 of FIG. 2). The Air-to-Ground Communications Unit 402 includes a plurality of Air-to-Ground Modems 411, 412 for terminating the radio frequency links maintained by Cells 421, 422. The Air-to-Ground Communications Unit 402 also includes a Mobile IP Client 413. The radio frequency design for the Air-To-Ground Modem typically uses multiple modems, where one Air-To-Ground Modem (Air-to-Ground Modem 411) operates with a Vertical signal polarization and one Air-To-Ground Modem (Air-to-Ground Modem 412) operates with a Horizontal signal polarization; and as signal strength is lost/gained on the individual Air-To-Ground Modems, that Air-To-Ground Modem becomes dormant or active.

In this embodiment, the Air-To-Ground Modems 411, 412 are not assigned an IP address, but the Mobile IP Client 413 on the Air-To-Ground Communications Unit 402 is assigned a single IP address with a Foreign Agent 416 on the Public Data Switched Network 401. This Mobile IP Client 413 is configured with a Home Address 414 and registers with a corresponding Foreign Agent 416/Home Address 414 to associate a Home Address with Air-To-Ground Modem411 or Air-To-Ground Modem 412 on the Public Data Switched Network 401. The Home Address 414 to Care of Address 415 (subnet address) association does not change, since the Care of Address 415 is the Public Data Switched Network 401 IP address and is managed in the Public Data Switched Network 401. The Mobile IP Client 413 on the Air-To-Ground Communications Unit 402 requires information from the Air-To-Ground Modems 411, 412 to update Mobile IP bindings on Foreign Agent 416/Home Address 414. The Mobile IP Client 413 must receive both of the Air-To-Ground Modem 411 and Air-To-Ground Modem 412 Assigned IP addresses (this is the Care of Address for the Mobile IP Client 413). The Mobile IP Client 413 shall have configured/known Home Address 414 and Home Agent Server Address 419. This configuration can run multiple Mobile IP Clients and tunnels on the Air-To-Ground Communications Unit 402.

Figure 5:
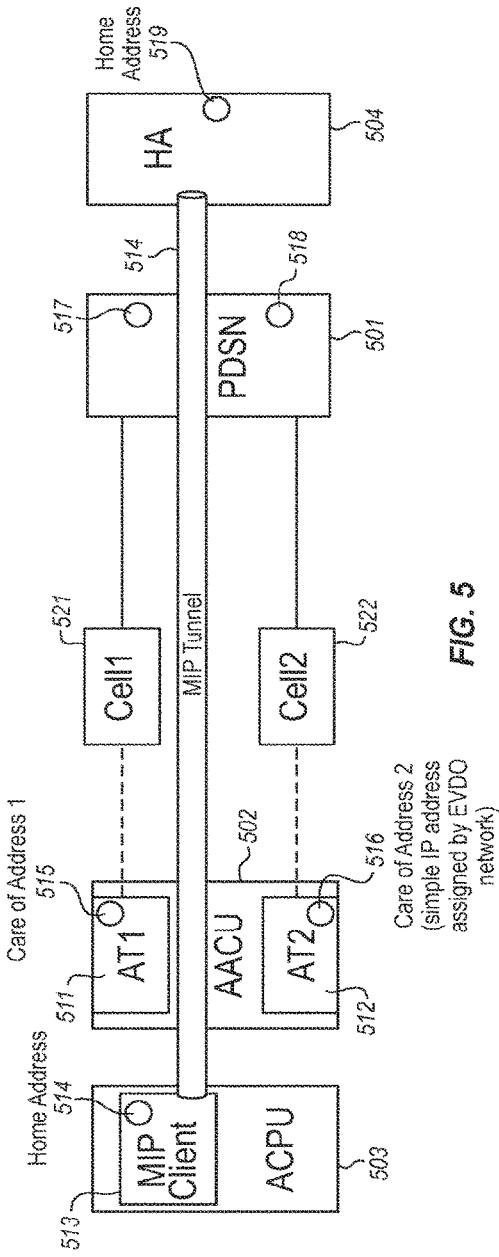
FIG. 5 illustrates, in block diagram form, the architecture of an implementation of the Aircraft Mobile IP Address System which provides mobile IP addresses outside of the EVDO Network using a Mobile IP tunnel.

FIG. 5 illustrates, in block diagram form, the architecture of an implementation of the Aircraft Mobile IP Address System which provides mobile IP addresses outside of the EVDO Network using a Mobile IP tunnel. In this second embodiment of the protocol, the Air-To-Ground Modems 511, 512 are each assigned an IP address, and the Mobile IP Client 513 resides on the Air-To-Ground Control Processor Unit 503. This Mobile IP Client 513 is configured with a Home Address 514, and corresponding Care of Addresses 515, 516 are associated with Air-To-Ground Modem 511 and Air-To-Ground Modem 512, respectively, in the Air-To-Ground Communications Unit 502. The Mobile IP Client 513 on the Air-To-Ground Control Processor Unit 503 is connected via a Mobile IP Tunnel 514 to the Public Data Switched Network 501. The radio frequency design for the Air-To-Ground Modem typically uses multiple modems, where one Air-To-Ground Modem (Air-to-Ground Modem 511) operates with a Vertical signal polarization, and one Air-To-Ground Modem (Air-to-Ground Modem 512) operates with a Horizontal signal polarization; and as signal strength is lost/gained on the individual Air-To-Ground Modems, that Air-To-Ground Modem becomes dormant or active.

This implementation uses a Mobile IP Client 513 on the Air-To-Ground Control Processor Unit 503 and no Foreign Agent since the Care of Addresses 515, 516 are configured on the Mobile IP Client 513, which is beyond the Home Address 514 and Home Agent Server 519 address. In operation, the single Mobile IP Client 513 registers with Home Agent 504 and can utilize the Care of Addresses 515, 516 of either Air-To-Ground Modem 511 or Air-To-Ground Modem 512. When the single Mobile IP Client 513 is registered, the Home Agent 504 has a Mobile IP tunnel 504 to Care of Address 1 (515) on Air-To-Ground Modem 511 or Care of Address 2 (516) on Air-To-Ground Modem 512. The Mobile IP Client 513 on the Air-To-Ground Control Processor Unit 503 requires information from the Air-To-Ground Communications Unit 502 to update Mobile IP bindings on Home Agent Server 519. The Mobile IP Client 513 must receive the IP addresses assigned by the Air-To-Ground Modem 511 and the Air-To-Ground Modem 512 (this is the Care of Address 515, 516 for the Mobile IP Client 513. The Mobile IP Client 513 has configured/known Home Address 514 and Home Agent Server Address 519. There is a Mobile IP Tunnel 504 per Air-To-Ground Modem 511, 512, or a Mobile IP Tunnel 504 per WiFi Client.

Figure 6:
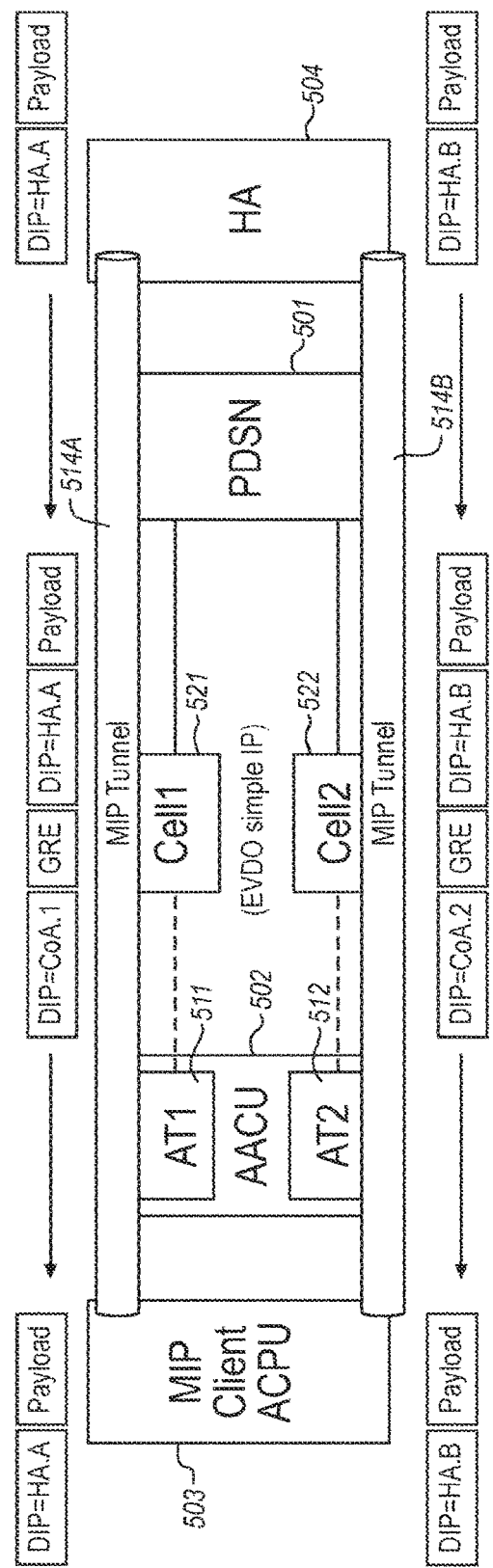
FIG. 6 illustrates typical addressing used in the system of FIG. 5.
Figure 7:
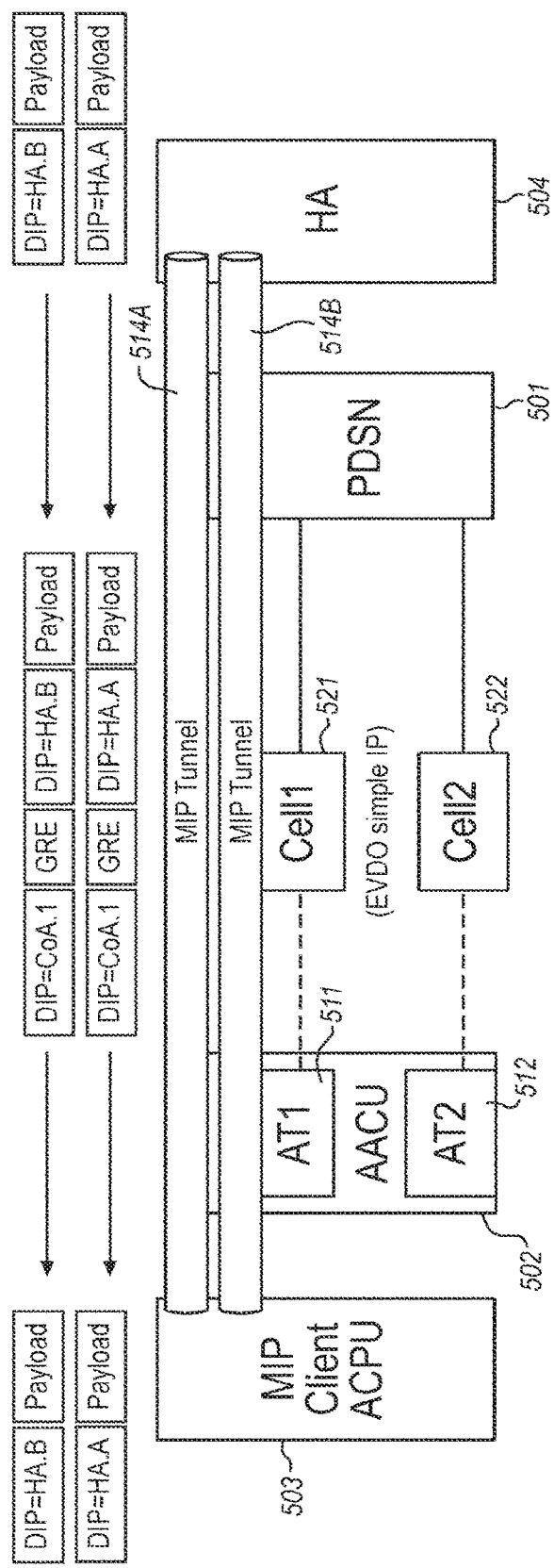
FIG. 7 illustrates the transfer of an IP Tunnel between Air-to-Ground Modems with the change in typical addressing used in the system of FIG. 6.

FIG. 6 illustrates typical addressing used in the system of FIG. 5, and FIG. 7 illustrates the transfer of an IP Tunnel between Air-to-Ground Modems with the resulting change in typical addressing that is illustrated in FIG. 6. In these Figures, there are data streams arriving at the Public Data Switched Network 501 which consist of a data Payload and a prepended destination address of DIP=HA.A and DIP=HA.B. As these data streams are transported in the MIP Tunnels 514A and 514B, an address, consisting of the Care of Address CoA.1 and CoA.2, respectively, as well as a Generic Routing Encapsulation GRE, is prepended to the data streams. Once received at the Air-To-Ground Control Processor Unit 503, these data streams have the new address headers stripped off and the original addressing is restored. In FIG. 7, the one MIP Tunnel is routed via the Air-To-Ground Modem 511 with the resultant addressing changes in the prepended address used in the MIP Tunnel of DIP=CoA.2 becoming DIP=CoA.1 for this flow.

Figure 8:
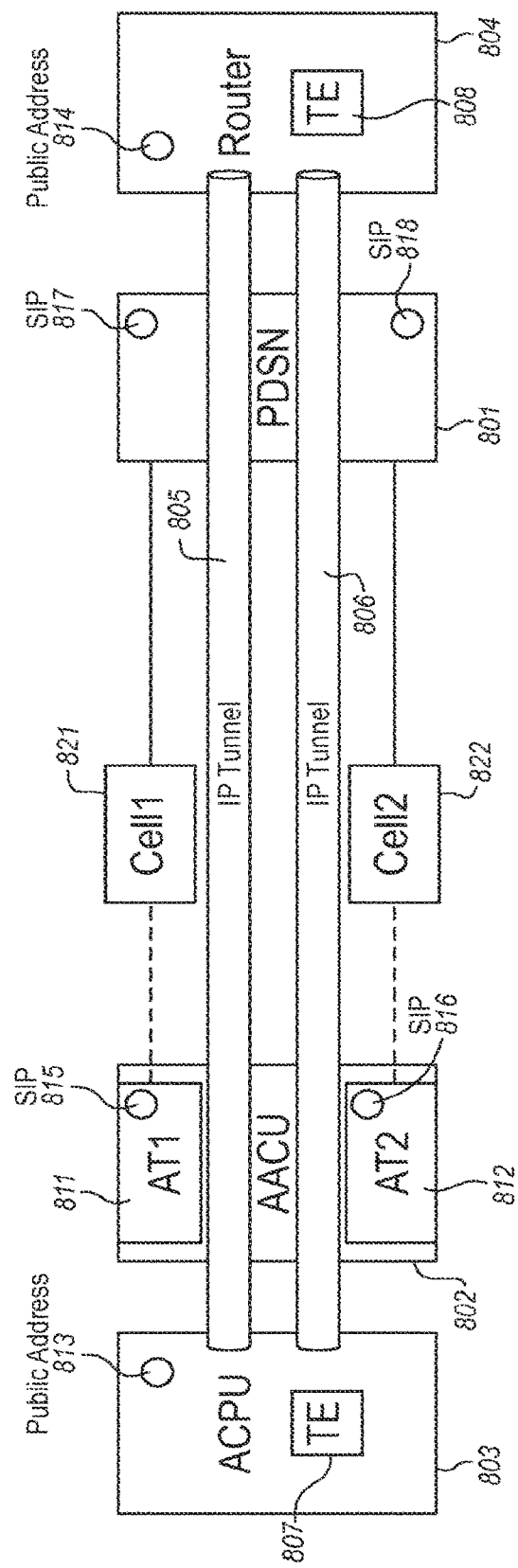
FIG. 8 illustrates, in block diagram form, the architecture of an implementation of the Aircraft Mobile IP Address System which provides mobile IP addresses outside of the EVDO Network using IP tunnels.

FIG. 8 illustrates, in block diagram form, the architecture of an implementation of the Aircraft Mobile IP Address System which provides mobile IP addresses outside of the EVDO Network using IP tunnels. In this third embodiment of the protocol, the Air-To-Ground Modems 811, 812 are each assigned an IP address, and Simple IP Addresses are managed on the Air-To-Ground Communications Unit 802. Multiple IP Tunnels 805, 806 connect the Air-To-Ground Control Processor Unit 803 to a Router 804 in the ground-based Access Network. The Air-To-Ground Control Processor Unit 803 performs the tunnel endpoint functions and uses a Public Address 813 for these IP Tunnels 805, 806. The traffic is switched between the two Air-To-Ground Modems 811, 812 as signal strength is lost/gained on the individual Air-To-Ground Modems 811, 812.

FIG. 8 is an example of provision of a mobile IP address outside of the EVDO Network. Both Air-To-Ground Modems 811, 812 are traffic modems where both connect and attempt to establish sessions/connections. Each Air-To-Ground Modem 811, 812 has a Simple IP address assigned to it, which is routable within the Aircraft Network. As with the systems described above, the radio frequency design for the Air-To-Ground Modem typically uses multiple modems, where one Air-To-Ground Modem (Air-to-Ground Modem 811) operates with a Vertical signal polarization, and one Air-To-Ground Modem (Air-to-Ground Modem 812) operates with a Horizontal signal polarization; and as signal strength is lost/gained on the individual Air-To-Ground Modems, that Air-To-Ground Modem becomes dormant or active.

The Air-To-Ground Control Processor Unit 802 performs Tunnel Endpoint Functions as defined in the industry standards documents and requires that a Tunnel Endpoint Public Address 813 be configured on the Tunnel Endpoint Client 807 executing on the Air-To-Ground Control Processor Unit 803. The Air-To-Ground Control Processor Unit 803 can tunnel data over Air-To-Ground Modem 811 and/or Air-To-Ground Modem 812, based on Air-To-Ground Modem performance data (SINR, Sector Loading, etc.). At the ground-based terminus of this link, the Router 804 performs the Tunnel Endpoint 808 functions. Alternatively, a Server 808 can be implemented in the Core Network of FIGS. 3A and 3B to implement the Tunnel Endpoint functions.

The Server 808 is in the Core Network, and the Client 807 is on the Air-To-Ground Control Processor Unit 803. The IP data transmitted over this link appears no different with respect to application content from IP data not transmitted over this link. The Client 807 processes packets just prior to transmission and is the first to process packets upon reception such that the tunneling protocol is transparent to higher level software. Thus, the WiFi Client IP Address maintained after passing through the Tunnel(s) is transparent multiple IP tunneling. All fragmentation and reassembly of data are easily handled because the TCP sessions are terminated at the Client 807 and Server 808. Only data passes through the tunnel, and the packet boundaries used within the packets transmitted through the tunnel have no relationship to the original TCP/IP packetization. Therefore, TCP/IP fragmentation between the WiFi client and Client 807 is completely isolated from the TCP/IP connection between the Sever 808 and the origin server and vice-versa. Data may be fragmented between the Server 808 and origin server, and this fragmentation has no effect on the TCP connection between the Client 807 and the WiFi client.

SUMMARY

The Aircraft Mobile IP Address System enables the assignment of individual Internet Protocol (IP) addresses to each of the passenger wireless devices, operating in an aircraft and served by an airborne wireless cellular network, thereby to enable delivery of wireless services to the individually identified wireless devices.

What is claimed is:

1. A method for routing data to a plurality of passenger wireless devices which are located onboard an aircraft in-flight, comprising:

receiving, at one or more computing devices fixedly connected to the aircraft in-flight and via a first Air-To-Ground Modem, a first portion of a data stream via an Internet Protocol (IP) Tunnel, the data stream including data packets having content that is to be delivered to a particular passenger wireless device onboard the aircraft in-flight;

stripping off, by the one or more computing devices, a first Care-of IP (Internet Protocol) Address from the first portion of the data stream, the first Care-of IP Address assigned to the first Air-To-Ground Modem;

routing the stripped-off first portion of the data stream to the particular passenger wireless device based on a Destination IP Address remaining in the stripped-off first portion of the data stream, the Destination IP Address uniquely identifying the particular passenger wireless device within an aircraft communication network to which the particular passenger wireless device is communicatively connected; and subsequent to stripping off the first Care-of IP Address from the first portion of the data stream, the IP Tunnel is transferred from being received via the first Air-To-Ground Modem to being received via a second Air-To-Ground Modem, and the method further comprises:

receiving, at the one or more computing devices and via the second Air-To-Ground Modem, a second portion of the data stream, the second portion of the data stream including a second Care-of IP Address assigned to the second Air-To-Ground Modem instead of the first Care-of IP Address assigned to the first Air-To-Ground Modem;

stripping off the second Care-of IP Address assigned to the second Air-To-Ground Modem from the second portion of the data stream in lieu of stripping off the first Care-of IP Address; and routing the stripped-off second portion of the data stream to the particular passenger wireless device based on the Destination Address remaining in the stripped-off second portion of the data stream.

2. The method of claim 1, further comprising hosting, by the one or more computing devices, a Home Address with which the first Care-of IP Address and the second Care-of IP Address are associated.

3. The method of claim 2, wherein the Home Address is assigned by a Home Address Server that is terrestrially disposed.

4. The method of claim 3, further comprising updating, by the one or more computing devices, a first Mobile IP binding corresponding to the first Care-of IP Address and a second Mobile IP binding corresponding to the second Care-of IP Address at the Home Address Server.

5. The method of claim 2, wherein routing the stripped-off first portion of the data stream to the particular passenger wireless device based on the Destination IP Address remaining in the stripped-off first portion of the data stream comprises routing the stripped-off first portion of the data stream to the particular passenger wireless device based on a Destination IP Address comprising the Home Address hosted by the one or more computing devices and an IP address portion that is unique within the aircraft communication network and assigned to the particular passenger wireless device.

6. The method of claim 1, further comprising receiving the first Care-of IP Address assigned to the first Air-To-Ground Modem and the second Care-of IP Address assigned to the second Air-To-Ground Modem from an Air-To-Ground Communications Unit disposed at the aircraft and in which the first Air-To-Ground Modem and the second Air-To-Ground Modem are included.

7. The method of claim 1, wherein each of the first Care-of IP Address and the second Care-of IP Address is a respective simple IP address.

8. A method for routing data to a passenger wireless device located onboard an aircraft in-flight, comprising:
   hosting, at one or more computing devices that are onboard the aircraft in-flight, a Home Address used to transparently transmit data packets between an aircraft network onboard the aircraft in-flight and a ground-based Access Network;
   stripping off, by the one or more computing devices, a first Care-of IP (Internet Protocol) Address from a first portion of a data stream received onto the aircraft in-flight from the ground-based Access Network via a first Air-To-Ground Modem and an Internet Protocol (IP) Tunnel, the data stream including data packets having content that is to be delivered to a particular passenger wireless device communicatively connected to the aircraft network, and the first Care-of IP Address assigned to the first Air-To-Ground Modem;
   routing, by the one or more computing devices, the stripped-off first portion of the data stream to the particular passenger wireless device based on a Destination IP Address remaining in the stripped-off first portion of the data stream, the Destination IP Address uniquely identifying the particular passenger wireless device within the aircraft network and including the Home Address; and
   subsequent to stripping off the first Care-of IP Address from the first portion of the data stream, the IP Tunnel is transferred from being received onto the aircraft in-flight via the first Air-To-Ground Modem to being received onto the aircraft in-flight via a second Air-To-Ground Modem, and the method further comprises:
      stripping off, by the one or more computing devices, a second Care-of IP Address from a second portion of the data stream in lieu of stripping off the first Care-of IP Address, the second Care-of IP Address assigned to the second Air-To-Ground Modem via which the second portion of the data stream is received from the ground-based Access Network onto the aircraft in-flight; and
      routing the stripped-off second portion of the data stream to the particular passenger wireless device based on the Destination IP Address remaining in the stripped-off second portion of the data stream.

9. The method of claim 8, further comprising obtaining the first Care-of IP address and the second Care-of IP address from an Air-To-Ground Communications Unit that is disposed on board the aircraft in-flight, the Air-To-Ground Communications Unit including the first Air-To-Ground Modem and the second Air-To-Ground Modem.

10. The method of claim 8, further comprising updating, by the one or more computing devices, a set of Mobile IP bindings at a Home Address Server corresponding to the Home Address, the set of Mobile IP bindings including a first Mobile IP binding corresponding to the first Care-of IP Address and a second Mobile IP binding corresponding to the second Care-of IP Address.

11. The method of claim 10, wherein the Home Address is assigned by the Home Address Server, and the Home Address Server is terrestrially disposed.

12. The method of claim 8, wherein the first portion of the data stream is received onto the aircraft in-flight via the IP Tunnel supported by the first Air-To-Ground Modem, and the second portion of the data stream is received onto the aircraft in-flight via the IP Tunnel supported by the second Air-To-Ground Modem upon the transfer of the IP Tunnel from being supported by the first Air-To-Ground Modem to being supported by the second Air-To-Ground Modem.

13. The method of claim 8, wherein routing the stripped-off first portion of the data stream to the particular passenger wireless device based on the Destination IP Address remaining in the stripped-off first portion of the data stream comprises routing the stripped-off first portion of the data stream to the particular passenger wireless device based on a Destination IP Address comprising the Home Address hosted by the one or more computing devices and an IP address portion that is unique within the aircraft network and assigned to the particular passenger wireless device.

14. A system for routing data to a plurality of passenger wireless devices located onboard an aircraft in-flight, the system comprising:
   a plurality of Air-To-Ground Modems, each of which is assigned a respective Care-of IP (Internet Protocol) Address and is disposed onboard the aircraft in-flight; and
   an Air-To-Ground Processor Unit fixedly disposed onboard the aircraft in-flight and communicatively connected to an onboard aircraft network to which the plurality of passenger wireless devices are communicatively connected, the Air-To-Ground Processor Unit configured to:
      strip off a first Care-of IP Address from a first portion of a data stream received, via an Internet Protocol (IP) Tunnel, onto the aircraft in-flight via a first Air-To-Ground Modem included in the plurality of Air-To-Ground Modems, the data stream including data packets having content that is to be delivered to a particular passenger wireless device communicatively connected to the onboard aircraft network, and the first Care-of IP Address assigned to the first Air-To-Ground Modem;
      route the stripped-off first portion of the data stream to the particular passenger wireless device based on a Destination IP Address remaining in the stripped-off first portion of the data stream, the Destination IP Address uniquely indicating the particular passenger wireless device within the onboard aircraft network; and
      subsequent to stripping off the first Care-of IP Address from the first portion of the data stream, the IP Tunnel is transferred from being received onto the aircraft in-flight via the first Air-To-Ground Modem to being received onto the aircraft in-flight via a second Air-to-Ground Modem, and the method further comprises:
         strip off a second Care-of IP Address from a second portion of the data stream in lieu of stripping off the first Care-of IP Address, the second Care-of IP Address assigned to the second Air-To-Ground Modem included in the plurality of Air-To-Ground Modems and via which the second portion of the data stream is received onto the aircraft in-flight; and
         route the stripped-off second portion of the data stream to the particular passenger wireless based on the Destination IP Address remaining in the stripped-off second portion of the data stream.

15. The system of claim 14, wherein the respective Care-of IP Addresses are provided to the Air-To-Ground Processor Unit by the plurality of Air-To-Ground Modems.

16. The system of claim 14, wherein the Air-To-Ground Processor Unit hosts a Home Address, and wherein the Destination IP Address uniquely indicating the particular passenger wireless device within the onboard aircraft network includes the Home Address and an IP address portion uniquely indicating the particular passenger wireless device within the onboard aircraft network.

17. The system of claim 14, wherein the Air-To-Ground Processor Unit updates, with a Home Address Server, respective Mobile IP bindings corresponding to the respective Care-of IP Addresses assigned to the plurality of Air-To-Ground Modems, and wherein the Home Address Server is disposed terrestrially.

18. The system of claim 17, wherein the Home Address is assigned by the Home Address Server.

19. The system of claim 14, wherein:

the first portion of the data stream is received onto the aircraft in-flight via the IP Tunnel supported by the first Air-To-Ground Modem, and the second portion of the data stream is received onto the aircraft in-flight via the IP Tunnel upon the transfer of the IP Tunnel from being supported by the first Air-To-Ground Modem to being supported by the second Air-To-Ground Modem.

20. The system of claim 14, wherein each of the first Care-of IP Address and the second Care-of IP Address is a respective simple IP address.

* * * * *